United States Patent [19]

Ruddell

[11] 4,195,887
[45] Apr. 1, 1980

[54] ELASTOMERIC BUSHINGS

[75] Inventor: Adrian Ruddell, Los Gatos, Calif.

[73] Assignee: Burke Industries, Inc., San Jose, Calif.

[21] Appl. No.: 963,090

[22] Filed: Nov. 22, 1978

[51] Int. Cl.² ............................................. B62D 55/26
[52] U.S. Cl. ................................... 305/42; 74/251 R; 74/251 C; 198/853; 305/59; 403/225; 267/63 R
[58] Field of Search .............. 74/251 C, 251 R, 251 S; 198/851, 853, 859; 308/238; 305/41, 42, 43, 58 PC, 59, 58 R; 403/225, 228; 267/571 A, 63 R, 153

[56] References Cited

U.S. PATENT DOCUMENTS

| | | | |
|---|---|---|---|
| 2,011,817 | 8/1935 | Littlefield | 403/225 X |
| 2,430,573 | 11/1947 | Krotz | 305/59 X |
| 2,958,526 | 11/1960 | Ulderup et al. | 267/63 R |
| 3,313,578 | 4/1967 | Wright et al. | 305/58 X |
| 3,467,421 | 9/1969 | Bentley | 267/63 R X |
| 3,594,892 | 7/1971 | Stewart | 267/63 R X |

FOREIGN PATENT DOCUMENTS 428419  12/1947  Italy ......................................... 403/225

*Primary Examiner*—David A. Scherbel
*Attorney, Agent, or Firm*—James R. Cypher

[57] ABSTRACT

An elastomeric bushing especially useful in the construction of track-type vehicles. Track links of such vehicles are formed with circular openings and joined by octagonal link pins. A metal pin sleeve having an octagonally shaped internal opening slides onto the pin. The pin sleeve is formed with an elliptical cross sectional shape. An elastomeric bushing having an elliptical shape is bonded to the elliptical metal sleeve with their major axes at right angles to each other. The bushing is forced into the circular opening in the track link so that the elastomeric bushing is under compression.

5 Claims, 10 Drawing Figures

ELASTOMERIC BUSHINGS

BACKGROUND OF THE INVENTION

Track laying vehicles such as slow moving bull dozers have commonly used circular metal pins and circular metal bushings to connect the track links. The metal pins and bushings give no shock resistance, are noisy and incapable of high speed service. As the pin and bushing surfaces rotate with respect to one another there is wear due to the friction between the surfaces.

Knox, U.S. Pat. No. 1,955,751 (1934) saw the need for a different pin connection and provided a circular elastomeric bushing around the pin so that any flexing action between the pin and the track link took place through distortion of the rubber bushing. This form of circular bushing remains the standard connection in military tracked vehicles to the present time.

The compressive and shear loads placed on the elastomeric bushings far exceed the capabilities of present elastomers to withstand these loads and the elastomeric bushings wear out and must be replaced. Downtime on commercial track laying vehicles is costly and out of service time for military vehicles is a substantial problem.

Krotz, U.S. Pat. No. 2,430,573 (1947) attempted to alleviate the inordinate failure problem in the elastomeric bushings by bonding the elastomer to inner and outer metal sleeves and mounting the combination bushing on the track pin at an eccentric thereto. The eccentric bushing has not been generally accepted perhaps because the eccentric mounting provides greater elastomer thickness on one side of the pin, but a very thin amount of rubber on the other side of the pin. This construction assumes that the vehicle moves in a forwardly direction only, when in fact, construction or logging tractors move as often and at the same speeds in reverse. Further, the Krotz circular pin still concentrates a high load force on a small projected surface area which results in failure of the elastomer.

Wright, U.S. Pat. No. 3,313,578 (1967) recognized the wear problem of a metal pin in frictional sliding engagement with metal bushings and provided for greater metal thickness in the bushing areas. Wright retained the use of a circular pin with his metal bushing and made no use of an elastomeric bushing.

Clymer, U.S. Pat. No. 3,578,823 (1971) provides a "D" shaped elastomeric bushing for purposes of ease of installation. This bushing is of constant thickness and wear characteristics are assumed to be the same as those of present day circular bushings.

SUMMARY OF THE INVENTION

The gist of the present invention is the provision of an elliptical elastomeric bushing bonded to an elliptical metal pin sleeve to provide increased elastomeric thickness in the areas subject to the greatest compressive forces.

An object of the present invention is to provide an elastomeric bushing which will result in longer service thereby reducing the down time necessary to replace the bushings in track laying vehicles.

A further object is to provide an elastomeric bushing which provides better sound and vibration dampening.

Still another object is to provide increased shock absorption in a track laying vehicle.

Figure 9:
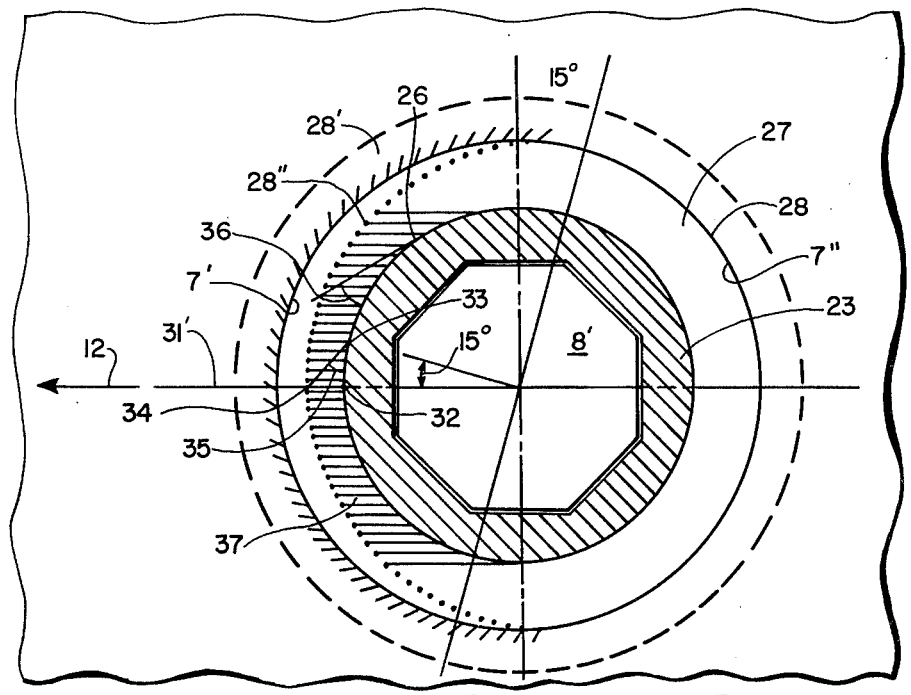
FIG. 9 is a schematic illustration of a bushing of the prior art. The housing and pin have been rotated 15° relative to each other. The dotted line shows the position of the elastomeric bushing after a 0.10" displacement.
Figure 10:
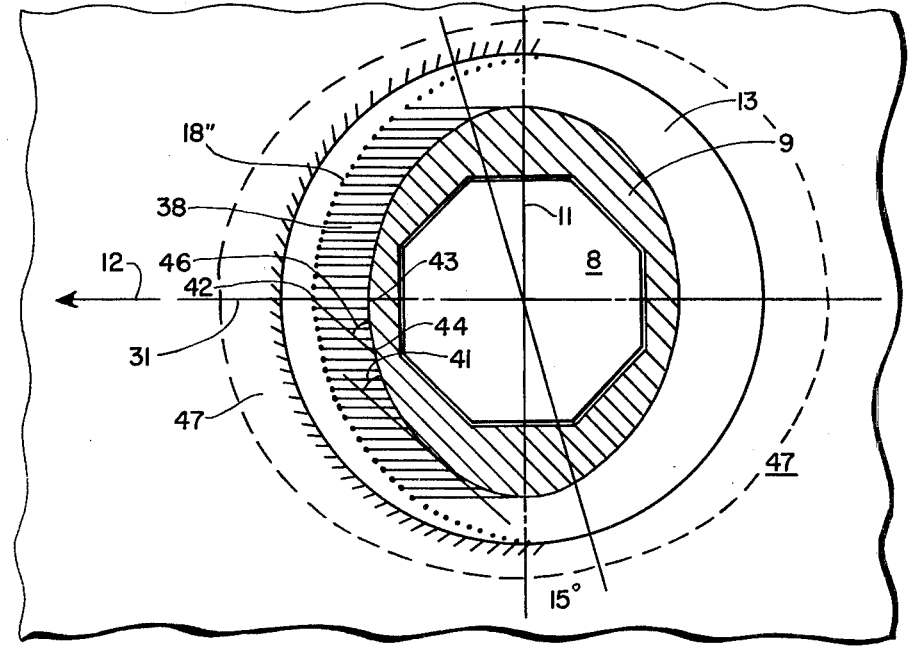
FIG. 10 is a schematic illustration of a bushing of the present invention. The housing and pin have been rotated 15° relative to each other. The dotted line shows the position of the elastomeric bushing after a 0.10" displacement.

The same volume of rubber in the circular and elliptical bushings is assumed in FIGS. 9 and 10.

DESCRIPTION OF THE INVENTION

Figure 1:
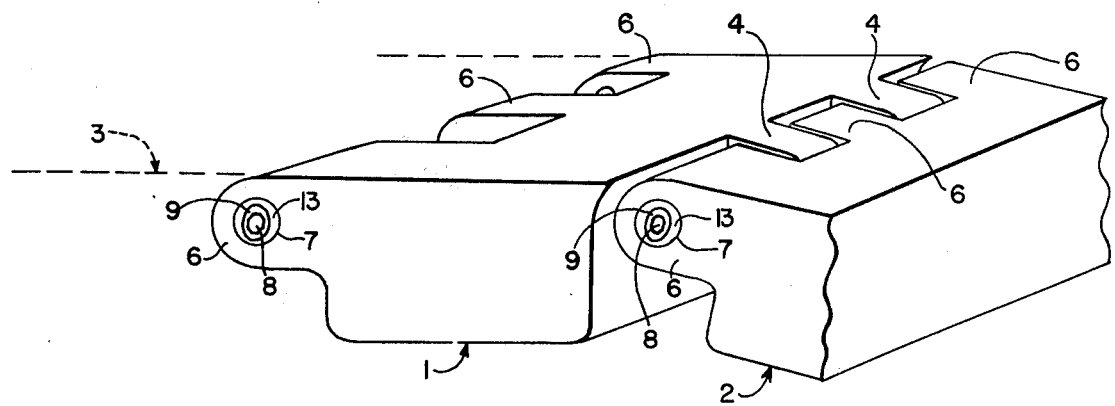
FIG. 1 is a schematic view of two links of an endless track in a track laying vehicle.
Figure 2:
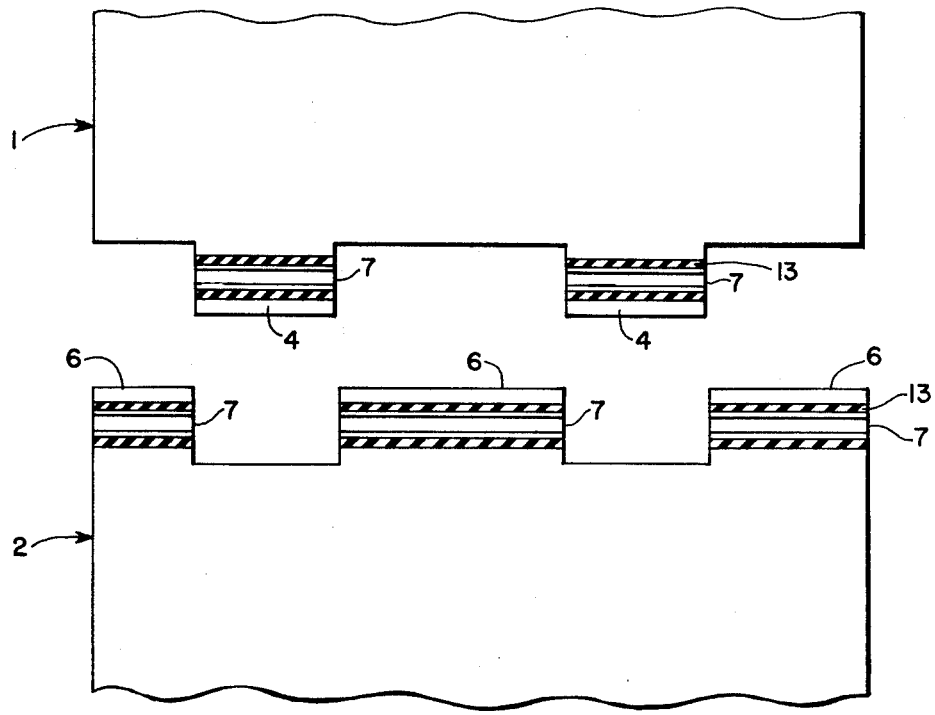
FIG. 2 is a top plan view of the portion of the track shown in FIG. 1 with the end opening areas shown in cross section.

Referring to FIGS. 1 and 2, numerals 1 and 2 designate successive links of a self laying track 3. Each link has one or more knuckles 4 on one end thereof and at least a pair of knuckles 6 at the opposite side, the knuckles being arranged with a knuckle 4 on one link extending between a pair of knuckles 6 of the next link. The knuckles have aligned cross bores 7 to receive hinge pins 8 which extend through the pair of knuckles 6 and through the knuckle 4 therebetween.

The pins preferably have an octagonal or other polygonal cross section.

A metal pin sleeve 9 having an elliptical cross sectional shape with a major axis 11 is removably mounted on the hinge pin so that the major axis is normal to the direction of maximum force exerted on the sleeve. In a tracked vehicle the major force is generally in the direction of travel of the vehicle both of which are indicated by arrow 12. (See FIGS. 9 and 10). In military vehicles, the direction of travel is nearly always forward but in contruction and logging vehicles, the vehicle may travel in reverse as often as in the forward direction and at equal speeds.

An elastomeric bushing 13 dimensioned for force fit mounting within the cross bores and having a molded elliptical cross sectional shape with a major axis 14 is bonded to the metal pin sleeve so that the major axis 14 of the elastomeric bushing is positioned parallel to the direction of maximum compression force 12 exerted on the bushing. This provides the greatest thickness of elastomer to resist the maximum force.

The pin and metal pin sleeve could be mounted at an eccentric to the elastomeric bushing as suggested by Krotz, U.S. Pat No. 2,430,573 but for most vehicles, the sleeve, bushing and pin should be mounted coaxially so that the two areas of greatest thickness of the elastomeric bushing as generally indicated by numerals 16 and 17 are substantially equal and diametrically opposed.

Preferably the pin 8' has an octagonal surface 29 which registers with octagonal opening 30 in the metal pin sleeve 9.

Figure 5:
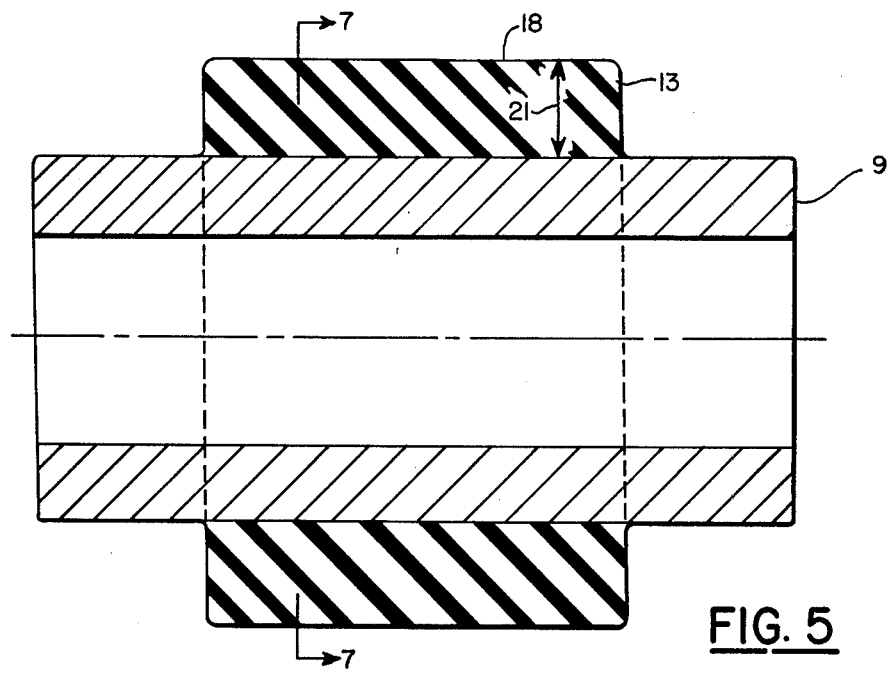
FIG. 5 is a longitudinal cross sectional view of the bushing of the present invention as molded.
Figure 6:
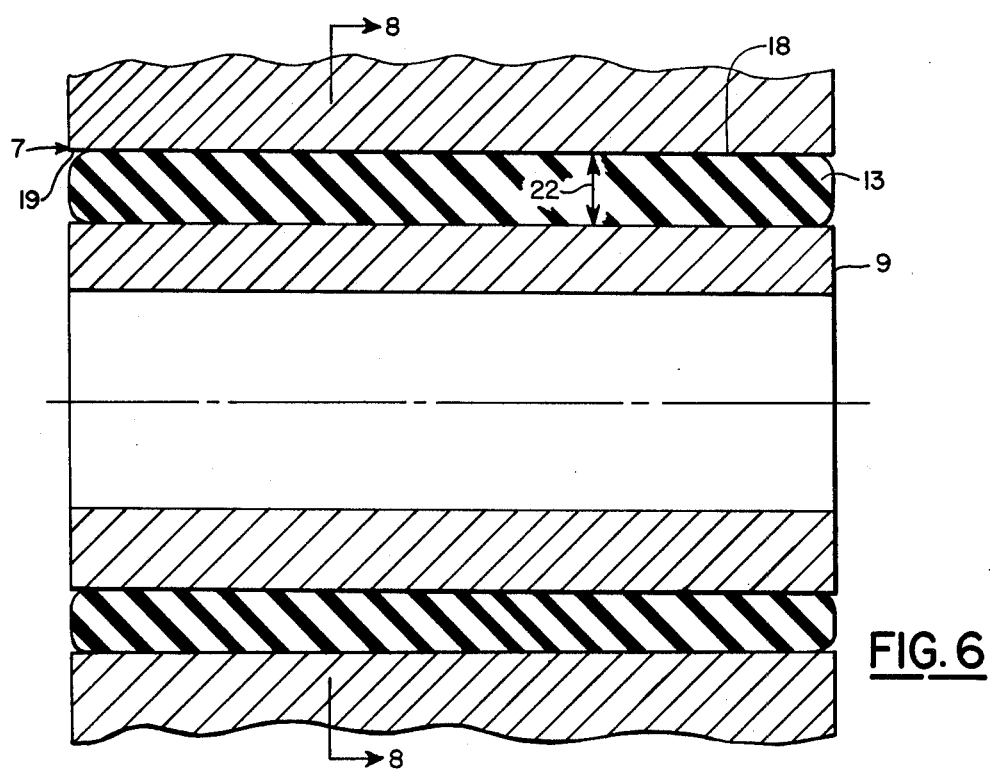
FIG. 6 is a longitudinal cross sectional view of the bushing of FIG. 5 assembled in a link as shown in FIG. 1.
Figure 7:
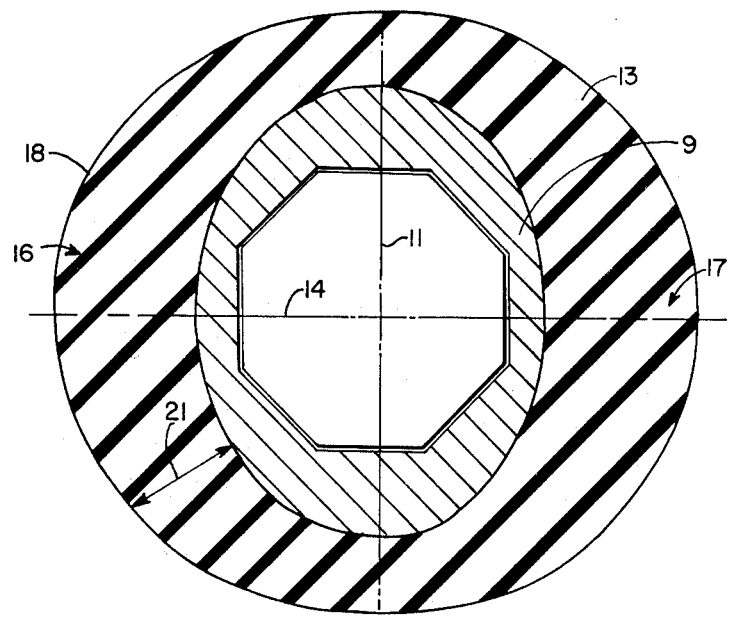
FIG. 7 is a cross sectional view of the bushing of the present invention taken along line 7—7 of FIG. 5.
Figure 8:
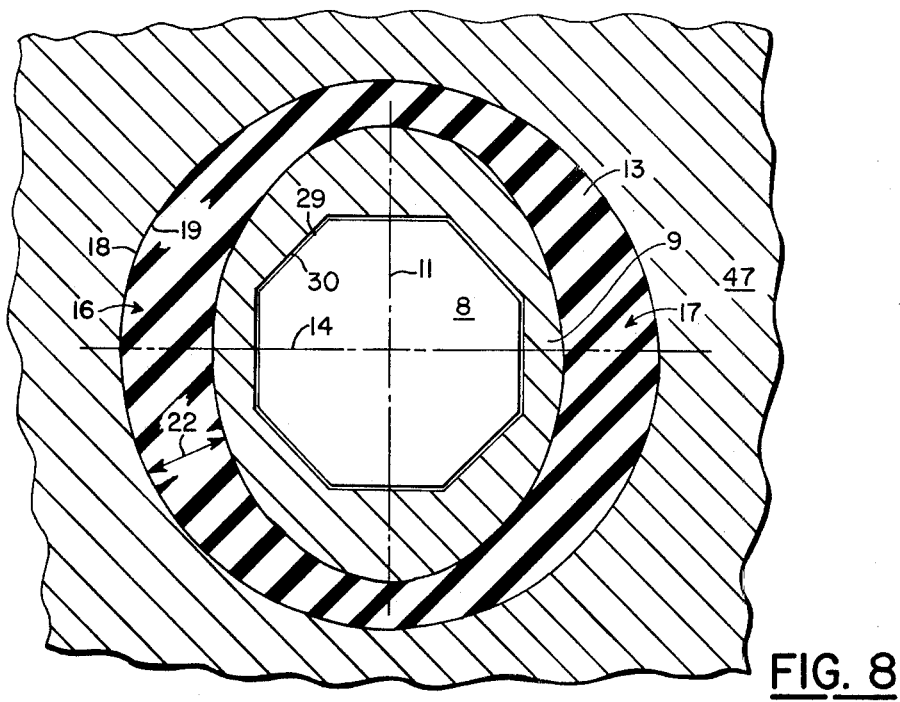
FIG. 8 is a cross sectional view of the bushing of the present invention taken along line 8—8 of FIG. 6.

In order to prevent relative movement between the outer surface 18 of the elastomeric bushing and the wall surface 19 of the cross bore 7 in the link 1, the elastomeric bushing 13 is molded as illustrated in FIGS. 5 and 7. The outside diameter of the elastomeric bushing 13 is molded so that its thickness 21 is approximately 20% greater than its installed thickness 22. The elastomer used in the bushing is rubber which for the design involved is considered to be incompressible. The rubber thus flows outwardly to the approximate position shown in FIG. 6.

Figure 3:
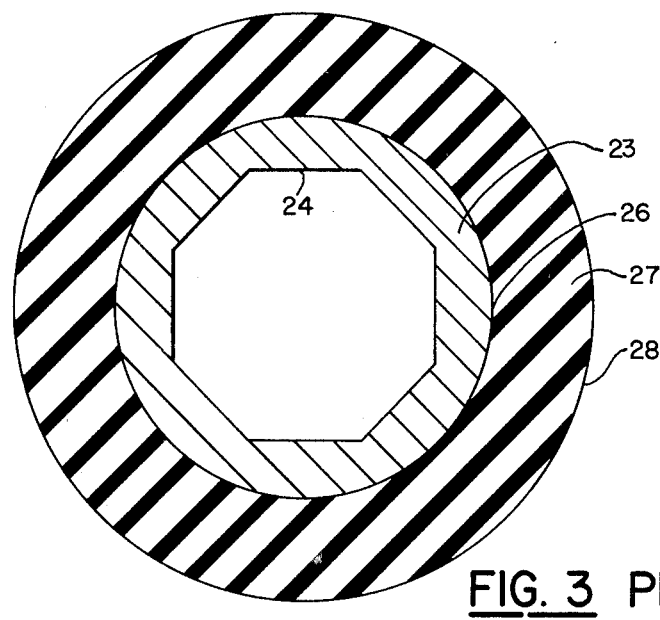
FIG. 3 is a cross sectional view of a prior art bushing as molded.
Figure 4:
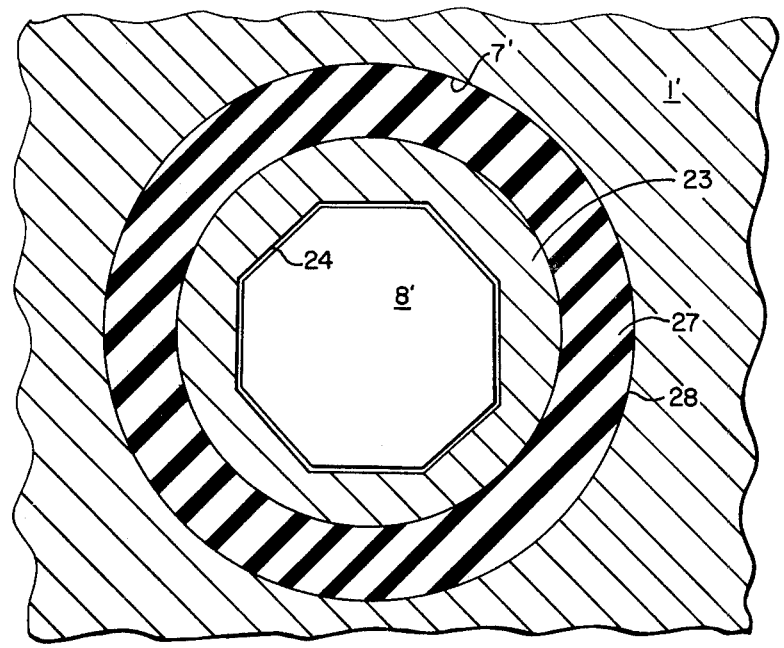
FIG. 4 is a cross sectional view of a prior art bushing as assembled in a circular opening in the type of link shown in FIG. 1.

The standard construction of elastomeric bushings is illustrated in FIGS. 3 and 4. An octagonal pin 8' connects the adjacent links of the endless track. A metal pin sleeve 23 having an octagonal opening 24 and a circular outer circumference 26 is dimensioned for sliding registration with the pin 8'. An elastomeric bushing 27 having a circular cross section with a generally circular surface 28 of constant thickness is bonded to the metal sleeve 23. The elastomeric bushing is molded as in FIG. 3 with a thickness approximately 20% greater than the installed thickness as illustrated in FIG. 4. It is standard practice to install the elastomeric bushings in circular cross bore openings 7' formed in the links 1' of the tracked vehicles. With this given compression load bushing, surface 28 does not move with respect to cross bore surface 7'.

There are hundreds of thousands of tracked vehicles in existence, which have links with circular cross bores and are connected by pins and elastomeric bushings. All of these vehicles must be regularly serviced because of bushing failure and new bushings installed. Since it is impractical to change the size and shape of either the pin or the cross bore opening, the only improvements which have been made in elastomeric bushings since their inception prior to 1934 has been in the formulation of the elastomer. Even with the use of greatly improved elastomers, the forces imposed have far exceeded the ability of the elastomers to withstand the compressive and torsional stresses. Further, the high design speeds of the vehicles rapidly build up heat in the elastomeric bushings which further reduces the ability of the elastomer to withstand the high stresses.

The advantages of the elliptical bushing over the circular bushing may be more clearly understood by reference to FIG. 9 which illustrates schematically the operation of the prior art circular bushing under load and FIG. 10 which illustrates schematically the operation of the elliptical bushing under load.

Referring first to the Prior Art bushing in FIG. 9, the dashed line 28' illustrates the molded outer circumference of the elastomeric bushing 27. The dotted line 28" indicates the shape the left half of the elastomeric bushing takes under full compression design load. In fact, it must be remembered that surface 28" actually is in contact with cross bore surface 7'. Since the elastomeric bushing is initially compressed into the circular opening, the right side of the elastomeric bushing remains in contact with the opposite wall 7" of the opening.

The pin 8' and link 1' are designed to oscillate 15° on either side of the horizontal axis 31'. Point 32 on the surface of the inside diameter of the elastomeric bushing 27 is assumed to move to point 33 when a 15° rotation occurs. Point 34 is assumed to remain fixed on surface 28". Angle 35 is formed between lines 33–32 and 33–34.

When the prior art circular bushing is subject to high compression forces due to track tension as represented by the arrow 12 in FIG. 9, the circular metal bush 23 concentrates load on the horizontal center line 31 between points 32 and 34 at the point of maximum rubber compression in a local high stress area. The resultant wedge shape of the rubber on each side of points 32 and 34 and the rapidly flattening angle 36 of the tangent to the surface 26 of the metal pin sleeve 23 make for a rapid decrease in the load carrying capacity of the outer extremes of the projected area of the circular sleeve.

Conversely, the elliptical metal pin sleeve 9 as illustrated in FIG. 10, under the same load conditions has greater rubber thickness for compression, and at the same amount of compression as represented by the dotted line 18" the rubber bush is much more constant in thickness for the full height of the projected area of the elliptical pin sleeve 9. The projected area of the circular sleeve is represented by the shaded area 37 in FIG. 9. The projected area of the elliptical pin sleeve is represented by the shaded area 38 in FIG. 10. Thus, the load is more evenly distributed avoiding the high load concentration present in the prior art circular pin and sleeve. Moreover, the tangent to the surface of the elliptical sleeve maintains a steeper angle 41 than with a circular sleeve, giving more effective load carrying capacity in the direction of travel of the track.

When the elastomeric bushing is subject to torsion while the track is under tension, the greatest angle of movement of the rubber occurs at the thinnest section of rubber compression, that is, at the point of highest load concentration at the horizontal line 31' in the prior art round sleeve design. The thickness is represented as the distance between points 32 and 34. This adds to the load concentration and breakdown of rubber at this local area. Specifically, referring to FIG. 9, when the elastomeric bushing is compressed to the design load as shown by the dotted line 28", and there is a 15° design rotation, point 32 on the inside surface of the elastomeric bushing moves to point 33. If point 34 on the outside surface of the bushing is assumed to remain in the same position, the angle of movement of the rubber is represented by the numeral 35. This is a small angle as compared with the angle of movement in an elliptical bushing as illustrated in FIG. 10 as will be explained as follows.

With an elliptical pin sleeve under the same tension and torque loads as set forth above, the rubber is thicker at the horizontal line of tension as represented by the distance from point 42 to point 43 thus giving a lesser angle of movement 42 than with a round pin sleeve. Specifically, referring to FIG. 10, when the bushing is under a compression load and the outer surface of the elastomeric bushing is displaced to the dotted line 18", and the pin 8 and the housing 47 are rotated 15° with respect to one another, point 43 moves to point 44. The angle of movement is thus represented by numeral 46 and, as can be seen, is less acute than angle 35 of the prior art illustrated in FIG. 9.

Further, because of the more constant thickness of rubber across the projected area of the elliptical pin sleeve as represented by the shaded area 38 in FIG. 10, the torsion loading is more evenly distributed. The pin sleeve can rotate as in a saddle represented by almost the full major diameter of the pin sleeve.

For purposes of comparison, both the circular prior art elastomeric bushing of FIG. 9 and the elliptical elastomeric bushing of FIG. 10 have the same volume of rubber and the same percentage compression of rubber. In practice, the volumes could vary. The greater efficiency of the elliptical bushing, in summary, is achieved by (1) The greater projected area of the pin sleeve presented in the direction of travel of the track; (2) The flatter aspect of the surface of the pin sleeve presented; (3) Improved distribution of the volume of rubber to give more rubber at the point of maximum load concentration; (4) Improved distribution of the track tension loading by the virture of the elliptical pin sleeve shape; and (5) Improved distribution of torsion loading by virtue of the elliptical pin sleeve shape.

I claim:

1. In an endless track for vehicles including track links formed with cross bores, articulately connected by track pins, the improvement comprising:
   a. a non-elastic pin sleeve having an elliptical cross sectional shape with a major axis removably mounted on said pin so that said major axis is normal to the direction of maximum force exerted on said sleeve; and
   b. an elastomeric bushing dimensioned for force fit mounting within said cross bores and having a molded elliptical cross sectional shape with a major axis and bonded to said sleeve so that said major axis is positioned parallel to the direction of maximum compressive force exerted on said bushing wherein there is a greater thickness of elastomer to resist said maximum force.

2. A bushing as described in claim 1 comprising:
   a. said pin is formed with a polygonal outer surface; and
   b. said pin sleeve is metal and is formed with a passage therethrough having a polygonal cross section for registration with said pin.

3. A bushing as described in claim 1 comprising:
   a. said pin sleeve elastomeric, bushing and pin are coaxially mounted so that the greatest thickness of said elastomeric bushing is substantially equal on diametrically opposed wall portions.

4. In an endless track as described in claim 1 wherein said cross bores are circular, the improvement comprising:
   a. said elastomeric bushing is molded with a wall thickness greater than its installed thickness.

5. A bushing as described in claim 4 comprising:
   a. said bushing is molded with a wall thickness approximately 20% greater than its installed thickness whereby the elastomeric bushing exerts a compressive force upon the wall of said cross bore sufficient to prevent relative movement therewith under normal service conditions.

* * * * *

UNITED STATES PATENT AND TRADEMARK OFFICE
CERTIFICATE OF CORRECTION

PATENT NO. : 4,195,887

DATED : April 1, 1980

INVENTOR(S) : Adrian Ruddell

It is certified that error appears in the above-identified patent and that said Letters Patent are hereby corrected as shown below:

In Column 4, line 57, delete [42] and insert --- 46 ---

Signed and Sealed this

Fifteenth Day of July 1980

[SEAL]

Attest:

SIDNEY A. DIAMOND

Attesting Officer

Commissioner of Patents and Trademarks